United States Patent [19]

Dorr

[11] Patent Number: 4,715,226
[45] Date of Patent: Dec. 29, 1987

[54] ULTRASONIC APPARATUS FOR DETERMINING THE AMOUNT OF LIQUID IN A CONTAINER OF KNOWN VOLUME

[75] Inventor: John A. Dorr, Crofton, Md.

[73] Assignee: Xecutek Corporation, Annapolis, Md.

[21] Appl. No.: 896,972

[22] Filed: Aug. 15, 1986

[51] Int. Cl.$^4$ .............................................. G01F 23/28
[52] U.S. Cl. ..................................... 73/290 V; 73/149
[58] Field of Search ..................... 73/602, 628, 290 V, 73/149

[56] References Cited

U.S. PATENT DOCUMENTS

| | | | |
|---|---|---|---|
| 3,184,969 | 5/1965 | Bolton | 73/290 V |
| 4,210,969 | 7/1980 | Massa | 73/290 V |
| 4,470,299 | 9/1984 | Soltz | 73/290 V |

*Primary Examiner*—Jerry W. Myracle
*Attorney, Agent, or Firm*—Jim Zegeer

[57] ABSTRACT

An ultrasonic apparatus for determining the amount of liquid in a container of known volume includes at least a pair of ultrasonic transducers which are mounted a known distance apart relative to the liquid surface so that the ultrasonic energy reflected from the liquid surface traverses the following paths: (1) from a first of the transducers vertically to the liquid surface, and (2) from the first transducer to the liquid surface and then to the second transducer. A circuit measures the time of travel T corresponding to path (1) above, and T1 corresponding to one-half the travel time of path (2) above. The height H of liquid above the transducers is determined by solving the equation:

$$H = \frac{ST}{2\sqrt{(T' - T)(T' + T)}}$$

where S is the known distance between transducers, T is the travel time of ultrasonic energy directly or vertically to the liquid surface and T' is one-half the travel time between the two transducers reflected off the liquid surface.

2 Claims, 13 Drawing Figures

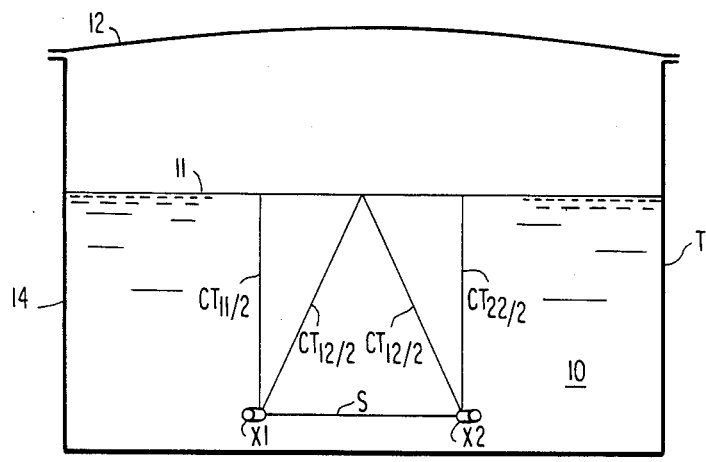
FIG. 1
FIG. 1a
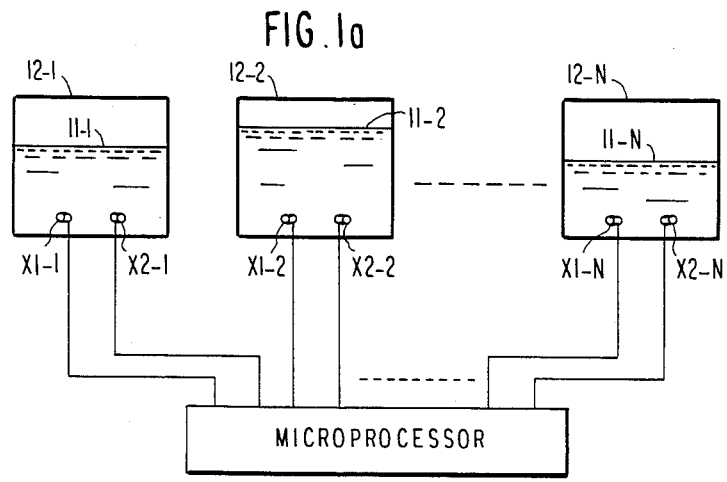
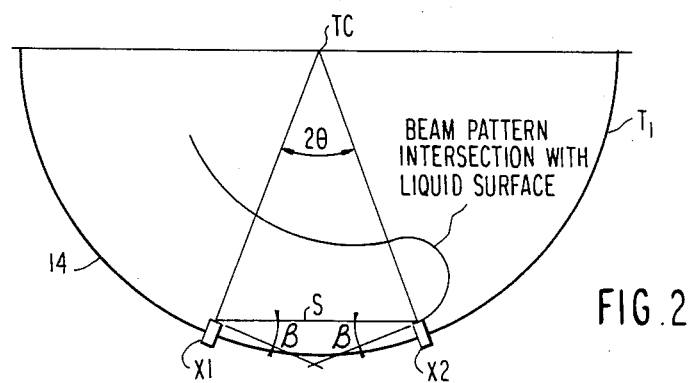
FIG. 2

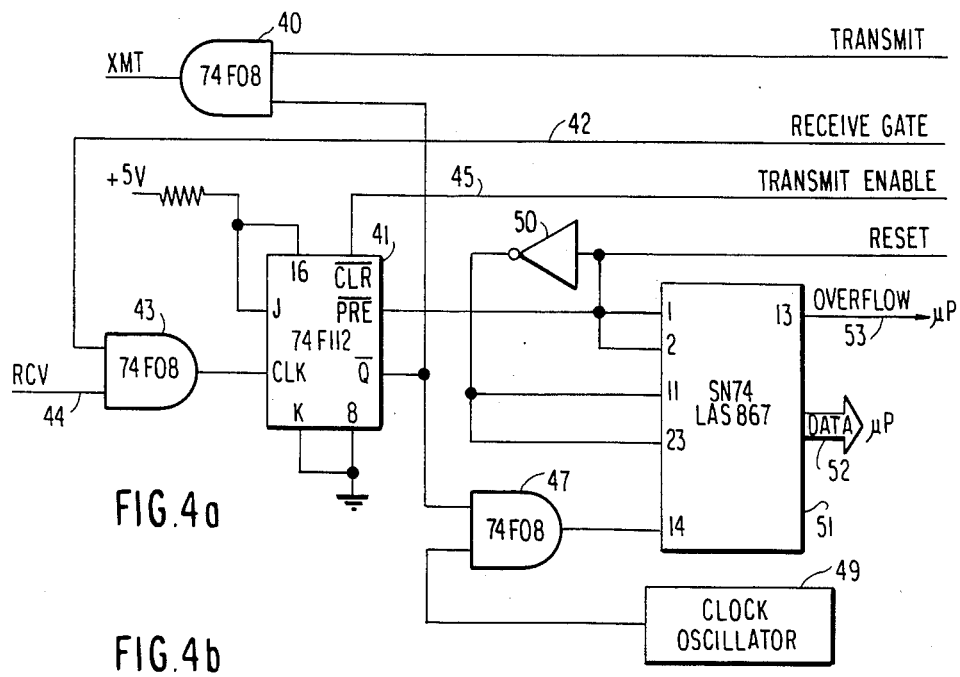
FIG.4a
FIG.4b
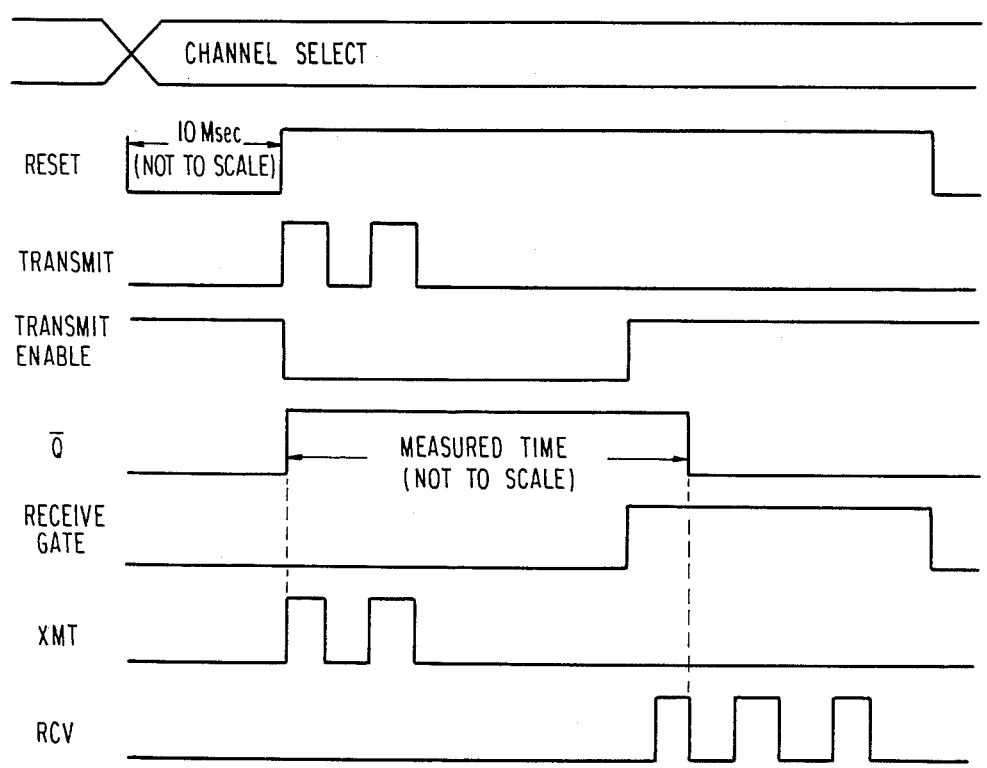

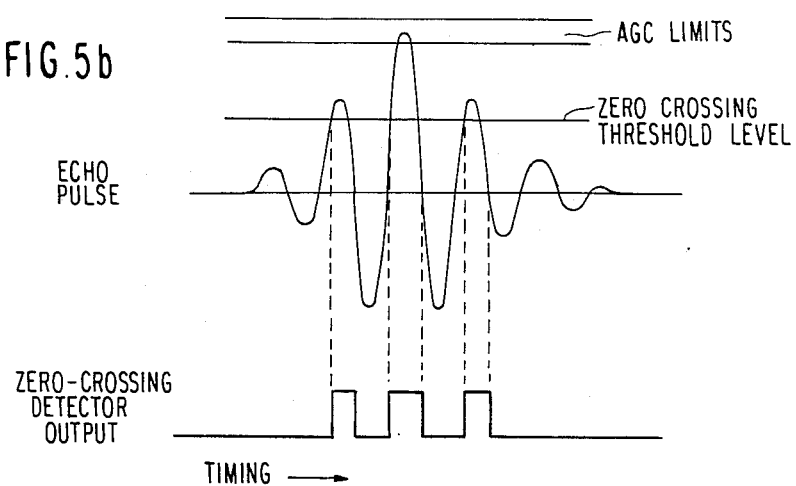
FIG.5b
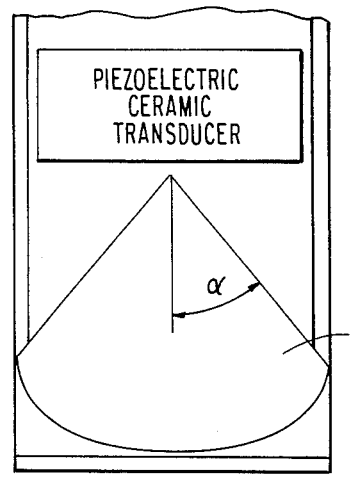
FIG.6c
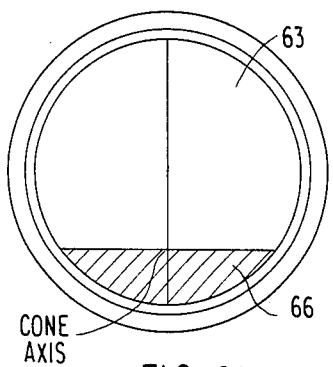
FIG.6b
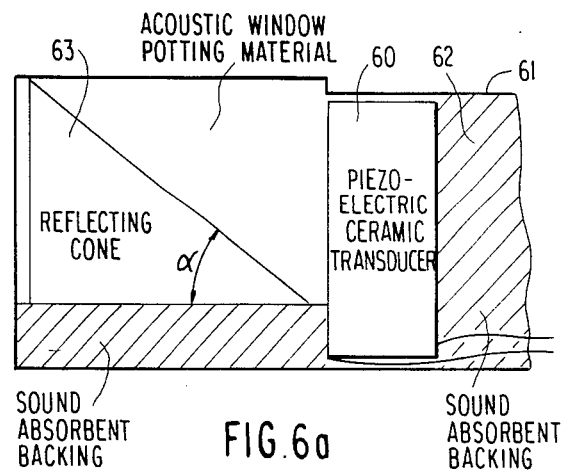
FIG.5a
FIG.6a

ULTRASONIC APPARATUS FOR DETERMINING THE AMOUNT OF LIQUID IN A CONTAINER OF KNOWN VOLUME

BACKGROUND AND BRIEF DESCRIPTION OF THE INVENTION

There are a number of prior art systems utilizing ultrasonic energy for determining the contents of a container. For example, Willis et al. U.S. Pat. No. 3,834,233 utilized a stilling pipe mounted within a stand pipe to direct sound energy down into the tank and receive an echo from the surface of the contents. To compensate for inaccuracies due to changes in the velocity of sound in air, a second receiver is position a fixed distance from the transmitter and both receive signals are processed to cancel the effects of any velocity variation in the speed of sound. A generally similar arrangement is shown in Massa U.S. Pat. No. 4,210,969 which utilizes a microprocessor located at the top of the tank and projecting a beam onto the fluid surface for determining the actual level of the fluid. A fixed target located a known distance from the ultrasonic transducer is utilized to compensate for temperature or gradation variations caused by presence of chemical vapors or gradations or temperature changes in the gas/air above the fluid level and a microprocessor system is utilized for making the measurement and for calibrating.

According to the present invention, two independent measurements of the same paths are made, and, since the geometry and the base leg of the triangle is known, the speed C of ultrasonic waves drops out. A pair of transducers are mounted, above or preferably below the liquid level and a fixed predetermined distance apart. One or both of the two transducers may be activated to transmit ultrasonic pulses to be reflected along the paths described above and measurements of the times between the two paths is utilized to calculate the height H of the liquid using the formula:

$$H = \frac{ST}{2\sqrt{(T'-T)(T'+T)}}$$

where S equals the known distance between transducers, T is the time for ultrasonic energy to vertically travel to the liquid surface and T' is the time for ultrasonic energy to travel between transducers via a reflection path at the liquid surface.

The invention provides a simple, inexpensive and highly accurate method of measuring fluid levels in tanks and is especially useful in measuring fluid levels in tank farms under microprocessor control.

According to the present invention, a pair of transducers are positioned at a fixed distance apart and preferably below the surface of a liquid whose level is to be measured. Both transducers are microprocessor controlled and provide two independent measurements of range and since the geometry is known, it drops out of the measurement because the speed of sound over both paths is the same. At the interface between the liquid level and air or whatever gas is above the liquid, there is substantially complete acoustic reflection since the ratio of specific acoustic impedances between the two media determines the degree or amount of acoustic energy that leaves the liquid or enters the liquid if the transducers are located above the liquid surface. The invention thus avoids any effect of a temperature gradient. In a room, a temperature gradient of one degree per farenheit per foot means that the velocity can vary a large amount with each degree of change. Where extreme precision of measurement is required, the temperature gradient can drastically effect the accuracy. For example, the bottom of a tank in a fuel tank farm is at ground temperature or at about fifty-five degrees. The top of the fuel is somewhere near the average air temperature for the day, and the top will be hot or near the liquid temperature so that the temperature gradient in the chemical is made up of gases and will also vary with the quantity in the tank.

BRIEF DESCRIPTION OF THE DRAWINGS

The above and other objects, advantages and features of the invention will become more apparent when considered with the following specification and accompanying drawings wherein:

FIG. 1 is a side elevational view of a tank containing liquid and incorporating the invention, FIG. 1a is a diagrammatic illustration of a microprocessor serving a plurality of tanks or containers in a tank form each having transducers arranged as shown in FIG. 1, FIG. 2 is a plan elevational view thereof, FIG. 4a is a timing circuit and FIG. 4b is the timing waveform diagrams, FIG. 5a is a zero cross detector circuit diagram and FIG. 5b are the waveforms showing the echo pulse and the zero crossing detector output, FIG. 6a, 6b, and 6c illustrate a transducer construction incorporated in the invention.

DETAILED DESCRIPTION OF THE INVENTION

Figure 3:
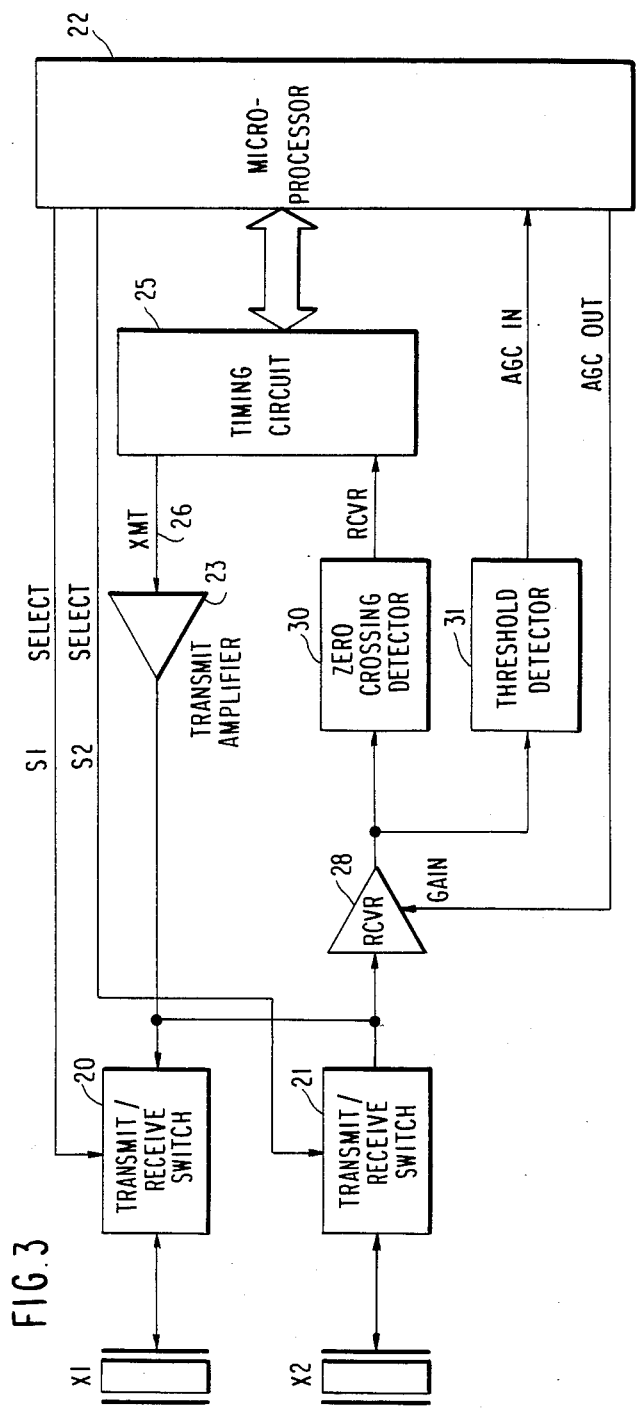
FIG. 3 is a block diagram of the circuit incorporating the invention.

Referring now to FIG. 1, a pair of transducers X1 and X2 are mounted in a tank having a liquid 10 with a given level 11 therein, the transducers X1 and X2 being spaced a known distance S apart. The tank may have a dome cover 12 and be one of a plurality of such tanks, each having a similar transducer arrangement therein for making the same measurements for each tank. The liquid level 11 varies in the tank and by knowing the level of the liquid in the tank and the volumetric capactity of the tank, the volume of liquid in the tank, or removed from the tank can be accurately calculated.

In the arrangement shown, there are four paths between the two transducers designated as path $CT_{11}/2$ which extends from transducer X1 to the liquid level surface 11, $CT_{12}/2$ which extend from the transducer X1 to the central point between transducers X1 and X2 at the liquid level 11, path $CT_{12}/2$ which extends from the liquid level surface to transducer X2 and vice versa, and path $CT_{22}/2$ which extends from the transducer X2 to the liquid level surface 11.

The transducers X, and X2 are mounted in a wall 14 of the tank T1 and with the distance S between transducers X1 and X2, the angle $2\theta$ is subtended from the tank center TC. The following relationships demonstrates that the temperature gradient in the liquid is eliminated as a factor by virtue of the two independent measurements of range and utilizing the known geometry.

In the following, the letter "C" stands for the speed or velocity of sound in the medium and T' is the time of travel of an ultrasonic pulse over the indicated path. By solving the simple geometric equations involving the known distance between the two transducers (e.g., the height of a triangle via pythagorean theorm), the velocity C drops out of the equation so that the speed of sound in the medium 10 (or in the air above the tank) does not have to be known because what is being basically measured is the time quantity T over the two paths. Thus, the variation in speed of sound in gradients in the media is eliminated. Thus, measurements of the speed of sound in a limied area as in the prior art can introduce errors which are avoided by the present invention.

The derivation is as follows:

$$CT_{22} = CT_{11} = CT = 2H \tag{1}$$

$$CT_{12} = CT' \tag{2}$$

$$\left(\frac{CT}{2}\right)^2 + \left(\frac{S}{2}\right)^2 = \left(\frac{CT'}{2}\right)^2 \tag{3}$$

$$C = \frac{2H}{T} \tag{4}$$

$$H^2 + \left(\frac{S}{2}\right)^2 = \left(H\frac{T'}{T}\right)^2 \tag{5}$$

$$H^2 + \left(\left(\frac{T'}{T}\right)^2 - 1\right) = (s/2)^2 \tag{6}$$

$$H = \frac{ST}{2\sqrt{\left(\frac{T'}{T}\right)^2 - 1}} \tag{7}$$

$$\left(\left(\frac{T'}{T}\right) - 1\right)\left(\frac{T'}{T} + 1\right) \tag{8}$$

$$\left(\frac{T'-T}{T}\right)\left(\frac{T'+T}{T}\right) \tag{9}$$

$$H = \frac{ST}{2\sqrt{(T'-T)(T'+T)}} \tag{10}$$

Referring now to FIG. 3, the pair of transducers X1 and X2 are piezoelectric transducers which are driven by transmit/receive switches 20, 21 which deceive select signals from a microprocessor 22. Microprocessor 22 can serve a large number of tanks 12-1, 12-2 . . . 12-N in a tank farm having similar transducers X1-1/X2-1, X1-2/X2-2 . . . X1-N/X2-N in the arrangement described above. The microprocessor sends transmit signals which are amplified by a transmit amplifier 23 and applied to both transmit and receive switches 20, 21. The microprocessor 22 supplies control signals to and receives timing signals from timing circuit 25 which is shown in detail in FIG. 4a. Thus, the timing circuit delivers transmit signals on line 26 to transmit amplifier 23 which supplies the transmit drive signals to transmit and receive switches 20 and 21 which are preferably alternately selected by select signals from microprocessor 22. Ultrasonic signals received by each of the transducers X1 and X2 is received by the transmit and receive switches 20, 21 and delivered to receive amplifier 28 which receives a gain control signal from the microprocessor 22 on line 29 to adjust the gain of receiver 28 in a fashion well known in the art. The output from receiver 28 is applied to two detectors: 0 cross detector 30 which supplies the received ultrasonic signals to the timing circuit 25 and to the threshold detector 31 which delivers the AGC signal into a microprocessor 29 which, in turn, supplies the AGC control signal on line 29 to the receiver 28.

Referring now to FIG. 4a, and the timing diagrams shown in FIG. 4b, the channel select signals applied to the transmit and receive circuitry 20, 21 are indicated in the top line of FIG. 4b. The transmit signals are received by AND gate 40 which must also receive the Q output of JK flip-flop 41 to thereby enable the transmit and receive switch 20. The received gate signal from the microprocessor 22 is received on line 42 and supplied to receive AND gate 43 which, in conjunction with the receive signal on receive line 44 gates the AND circuit 43 to supply a clock gating signal to JK flip-flop 41, which has been cleared by the transmit enable signal received on line 45. The Q output of JK flip-flop 41, in addition to being applied by AND gate 40 is also applied to a further AND gate 47 which receives as a second input a clock oscillator input from clock oscillator 49. The reset signals received from the microprocessor are applied via coupling element 50 to a counter 51. Thus, the clock oscillator 49 supplies pulses via gate 47 when there is a Q output on the JK flip-flop 41 and the data is applied to the microprocessor on the data bus 52 with the overflow data being supplied on overflow data bus 53. Microprocessor 22 performs the calculation to determine H and since the dimensions of the tank are known, the volume of liquid fluid in the tank can be calculated by the microprocessor which supplies the information to a utilization device which may be a recorder, a display device, or a valve, etc.

The zero crossing detector 30 is shown in detail in FIG. 5 and is used to set the AGC limits. The waveform diagram shown in FIG. 5b on terminal 9 provides the RCV zero output shown in the block diagram of FIG. 3 to the timing circuit shown in FIG. 4a.

A preferred form of the transducer is shown in FIGS. 6a, 6b and 6c. In these circuits, a piezoelectric ceramic transducer 60 (the electrodes not being shown) is mounted in a housing 61 backed by a sound absorbing backing material 62 which may be a butyl material. A reflecting cone 63 having a predetermined angle $\alpha$ is mounted to receive and transform the beam issuing from transducer 60 and coupled the reflected energy through an acoustic window which is composed of a convention acoustic potting material. A sound absorbent backing 66 is provided in the lower half below the cone 63.

Figure 7B:
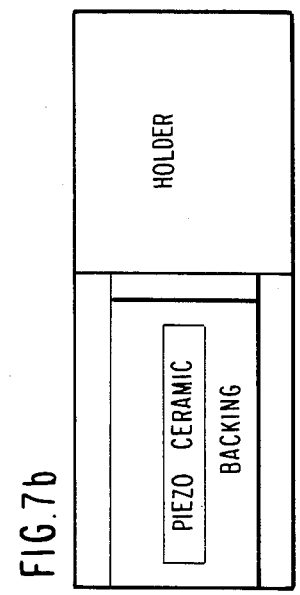
FIG. 7a and 7b illustrate an alternate form of the transducer design.
Figure 7A:
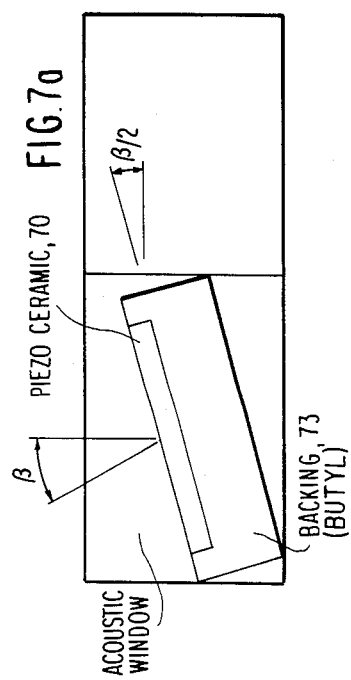

In the embodiment shown in FIGS. 7a and 7b, the piezoelectric ceramic transducer 70 has a backing 73 and is at an angle of $\beta 2$ where $\beta$ is the angle between the vertical and the beam path.

While there has been shown and described a preferred embodiment of the invention, it will be appreciated that many changes and modifications may be made therein without departing from the essential spirit thereof.

What is claimed is:

1. In an ultrasonic apparatus for determining the volume of liquid in a container of known volume, comprising:

at least a pair of ultrasonic transducers, means mounting said pair of transducers a known distance apart relative to the liquid surface so that ultrasonic energy reflected from said liquid surface traverses the following paths:
(1) from a first of said transducers to the liquid surface,
(2) from a first of said transducers immediately to said surface then and to said second of said transducers, means for measuring the time of travel T' of ultrasonic energy from said one transducer to said surface, means for measuring the time of travel T of ultrasonic energy from said first of said transducers to the other of said transducers as reflected from said liquid surface, means for computing the location of said surface of said liquid by solving:

$$H = \frac{ST}{2\sqrt{(T-T')(T+T')}}$$

where S equals the known distance between said pair of transducers, and means for computing the volume of liquid therefrom.

2. The apparatus defined in claim 1 wherein there are a plurality of said containers and a pair of ultrasonic transducers in each said container and a microprocessor for controlling the ultrasonic transducers in said containers.

* * * * *

UNITED STATES PATENT AND TRADEMARK OFFICE
CERTIFICATE OF CORRECTION

PATENT NO. : 4,715,226

DATED : December 29, 1987

INVENTOR(S) : John A. Dorr

It is certified that error appears in the above-identified patent and that said Letters Patent is hereby corrected as shown below: Title Page:

IN THE ABSTRACT:

Correct the equation as follows:

$$H = \frac{ST}{2\sqrt{(T'-T)(T'+T)}}$$

IN THE SPECIFICATION:

Column 3, line 13, correct the spelling of "limited".

Column 3, correct equation (3) as follows:

$$\left(\frac{CT}{2}\right)^2 + \left(\frac{S}{2}\right)^2 = \left(\frac{CT'}{2}\right)^2$$

Column 3, correct equation (5) as follows:

$$H^2 \left(\frac{S}{2}\right)^2 = \left(H\frac{T'}{T}\right)^2$$

Column 3, correct equation (6) as follows:

$$H^2 + \left(\left(\frac{T'}{T}\right)^2 - 1\right) = (s/2)^2$$

Column 3, correct equation (7) as follows:

$$H = \frac{S}{2\sqrt{\left(\frac{T'}{T}\right)^2 - 1}}$$

UNITED STATES PATENT AND TRADEMARK OFFICE
CERTIFICATE OF CORRECTION

PATENT NO. : 4,715,226

DATED : December 29, 1987

INVENTOR(S) : John A. Dorr

It is certified that error appears in the above-identified patent and that said Letters Patent is hereby corrected as shown below:

Column 3, correct equation (8) as follows:

$$\left(\left(\frac{T'}{T}\right) - 1\right)\left(\frac{T'}{T} + 1\right)$$

Column 3, correct equation (9) as follows:

$$\left(\frac{T' - T}{T}\right)\left(\frac{T' + T}{T}\right)$$

Column 3, correct equation (10) as follows:

$$H = \frac{ST}{2\sqrt{(T' - T)(T' + T)}}$$

Signed and Sealed this

Fifteenth Day of November, 1988

*Attest:*

DONALD J. QUIGG

*Attesting Officer*   *Commissioner of Patents and Trademarks*